(12) United States Patent
Kubota et al.

(10) Patent No.: US 8,086,868 B2
(45) Date of Patent: Dec. 27, 2011

(54) DATA COMMUNICATION METHOD AND SYSTEM

(75) Inventors: Tomoki Kubota, Tokyo (JP); Seiichi Hiratsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 1388 days.

(21) Appl. No.: 11/628,366

(22) PCT Filed: May 30, 2005

(86) PCT No.: PCT/JP2005/009862
§ 371 (c)(1),
(2), (4) Date: Dec. 4, 2006

(87) PCT Pub. No.: WO2005/122468
PCT Pub. Date: Dec. 22, 2005

(65) Prior Publication Data
US 2007/0226516 A1    Sep. 27, 2007

(30) Foreign Application Priority Data
Jun. 8, 2004    (JP) .................... 2004-170153

(51) Int. Cl.
*H04L 9/00*    (2006.01)
(52) U.S. Cl. ............ 713/186; 713/150; 713/155; 726/6; 726/28; 380/285; 380/255
(58) Field of Classification Search .................. 713/150, 713/155, 156, 168–171, 186; 726/3–6, 27, 726/28; 380/281–285, 255
See application file for complete search history.

(56) References Cited

U.S. PATENT DOCUMENTS 6,002,770 A    12/1999    Tomko et al.
2003/0140235 A1 *    7/2003    Immega et al. ............... 713/186

FOREIGN PATENT DOCUMENTS

| JP | 10-143556 | 5/1998 |
|----|-----------|--------|
| JP | 2001-044986 | 2/2001 |
| JP | 2001-168854 | 6/2001 |
| JP | 2001-216270 | 8/2001 |
| JP | 2001-357371 | 12/2001 |
| JP | 2003-134107 | 5/2003 |
| JP | 2003-308302 | 10/2003 |
| JP | 2003-535559 | 11/2003 |
| WO | 00/70542 | 11/2000 |
| WO | 03/040924 | 5/2003 |

OTHER PUBLICATIONS

Automated Fingerpring Identification by Minutiae-Network Features-Matching Process, in Transactions of IEICE D-II, J72-D-II, No. 5, pp. 733-740, May 1989 (in Japanese), Asau et al.
Supplementary European Search Report dates Aug. 4, 2011 in corresponding European Application No. 05 74 3277.

* cited by examiner

*Primary Examiner* — Vivek Srivastava
*Assistant Examiner* — Michael D Anderson
(74) *Attorney, Agent, or Firm* — Young & Thompson (57) ABSTRACT

Public-key cryptography is realized by means of PKI in which biometrics data, in which biological information of users is converted to numerical values, are used to authenticate users that transmit and receive data, and based on the biometrics data, identical secret keys (common secret keys) are generated in each of the user terminal devices that are used by the users without releasing the secret keys onto the network.

36 Claims, 7 Drawing Sheets

DATA COMMUNICATION METHOD AND SYSTEM

TECHNICAL FIELD

The present invention relates to a data communication method and system that use public-key cryptography.

BACKGROUND ART

With the current dramatic improvements in the processing capability of information processors such as personal computers, and moreover, the accompanying expansion of the communication infrastructure, opportunities are increasing for using a network such as the Internet to transmit and receive personal information or company information. As a result, security technology has become increasingly important for concealing such information to prevent disclosure to a third party.

Common-key cryptography is known as one typical method for concealing data that are transmitted and received. In this type of cryptography, terminal devices that transmit and receive data with each other use a common key to encrypt and decode the data. With the expansion of electronic commerce such as BtoB (Business to Business) and BtoC (Business to Consumer) transactions in recent years, PKI (Public Key Infrastructure) is also receiving attention (for example, see Japanese Patent Laid-Open No. 2001-216270).

In public-key cryptography that is known as the basic PKI technology, a public key is used to encrypt transmission data, and a secret key that is a pair with the public key but that is not published is used to decode the received data. This public key cryptography uses different keys on the transmission side and reception side and therefore increases the level of security over that of the above-described common-key cryptography. However, the public-key cryptography requires a relatively long time for the processes of encrypting and decoding data, and common-key cryptography is therefore generally more appropriate for data communication with a specific partner.

A technique for increasing the level of concealment achieved by the above-described public key and secret key (PKI key) is disclosed in, for example, Japanese Patent Laid-Open No. 2001-357371. In this technique, the user's fingerprint is read and a random number that is obtained from the fingerprint is used to encrypt the PKI key itself.

In the above-described common-key cryptography, both the transmission-side terminal device that encrypts data and the reception-side terminal device that decodes the data must have a common key, and a user that transmits data by way of a network must deliver the common key to the communication partner by some method. In data communication systems in recent years, the above-described public-key cryptography is used as a means for more safely delivering a common key.

However, in a method for transmitting a common key by public-key cryptography, the common key itself, although encrypted, is released onto the network, and the danger therefore exists that a third party with malicious intent may appropriate the common key.

Alternatively, when data are transmitted and received using only public-key cryptography, the secret key must similarly be delivered to the communication partner, and as a result, there is a danger that the secret key may be stolen by a third party having malicious intent when the network is used to deliver the secret key.

In other words, data communication systems of the prior art suffered from the problem that the risk of interception of a common key or secret key must always be kept in mind.

DISCLOSURE OF THE INVENTION

It is an object of the present invention to provide a data communication method and system that use public-key cryptography that can raise the level of concealment of data that are transmitted and received by way of a network and thus improve the level of security.

In the present invention for achieving the above-described object, biometrics data in which biological information of users is converted to numerical values are used to authenticate users that transmit and receive data, and based on the biometrics data, the same secret key (common secret key) are generated at each of the user terminal devices used by users.

The data communication method and system that use the public-key cryptography of the present invention eliminate the need to release common secret keys onto the Internet and thus reduce the risk of interception of secret keys. In particular, the biometrics data are different bit sequences for each extraction, and the common secret keys that are generated based on the biometrics data therefore also differ for each instance and thus have validity only as one-time keys. As a result, the level of security of communication realized by public-key cryptography that uses these common secret keys is improved.

BEST MODE FOR CARRYING OUT THE INVENTION

Explanation next regards the present invention with reference to the accompanying figures.

First Embodiment

The data communication system of the first embodiment realizes public-key cryptography by means of PKI without releasing secret keys to the network by both using biometrics data in which biological information of a user such as a fingerprint, iris, veins, handwriting, signature, hand or face shapes is converted to numerical values to authenticate users that transmit and receive data and, based on the biometrics data, generating the same secret key (common secret key) on each of user terminal devices that are used by the users.

Biometrics data normally cannot obtain exactly the same bit sequence with each extraction, and the determination of whether an individual is in fact a user is realized by means of the similarity between biometrics data that have been extracted (hereinbelow referred to as "inquiry data") and biometrics data that have been registered in advance (hereinbelow referred to as "registration data"). Accordingly, when inquiry data are used that have a bit sequence that is absolutely identical to that of inquiry data that were used in the past, there is a high possibility that a third party having malicious intent is posing as a user.

In the present embodiment, each user terminal device uses biometrics data having these properties to generate a common secret key, which is a one-time key, with each communication with a specific partner, whereby the level of concealment of data that are transmitted and received is improved.

Figure 1:
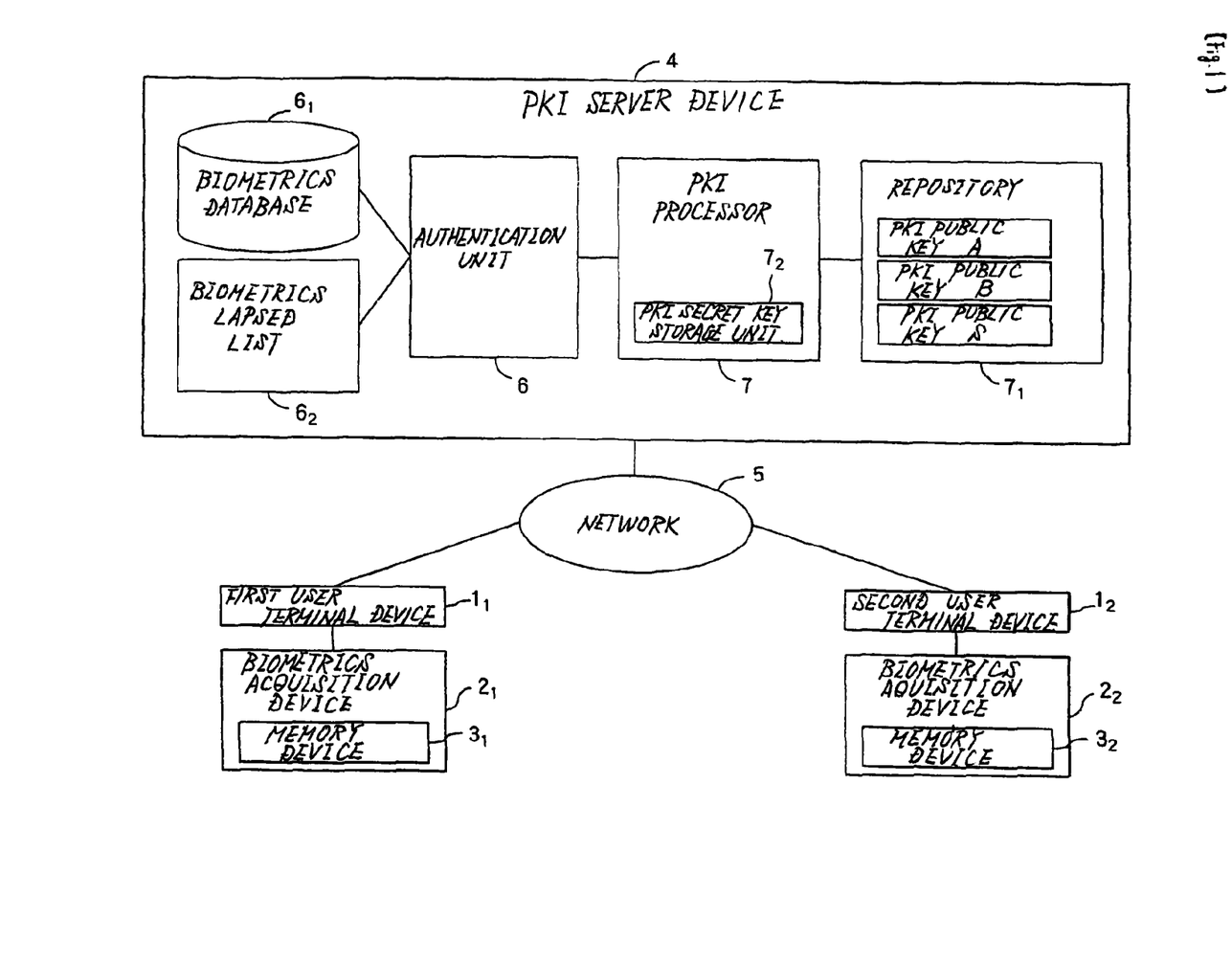
FIG. 1 is a block diagram showing the configuration of the first embodiment of the data communication system of the present invention.
Figure 2:
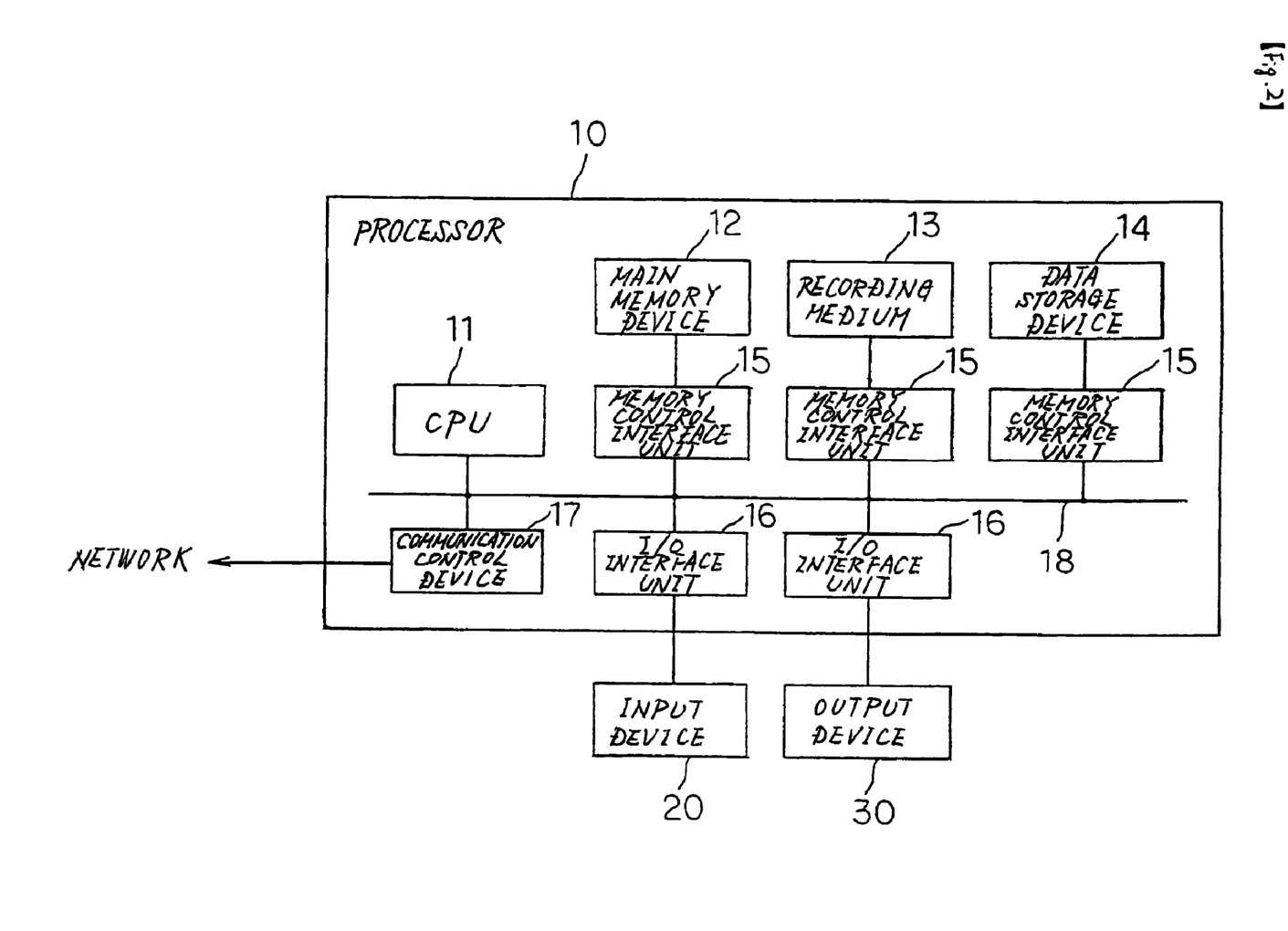
FIG. 2 is a block diagram showing an example of the configuration of the PKI server device shown in FIG. 1.

FIG. 1 is a block diagram showing the configuration of the first embodiment of the data communication system of the present invention, and FIG. 2 is a block diagram showing an example of the configuration of the PKI server device that is shown in FIG. 1.

As shown in FIG. 1, the data communication system of the first embodiment is of a configuration that includes: first user terminal device $1_1$ and second user terminal device $1_2$ that are used by users for transmitting and receiving data, these user terminal devices $1_1$ and $1_2$ being provided with biometrics acquisition device for acquiring biometrics data of the users; and PKI server device 4 that implements: registration of biometrics data that are transmitted from first user terminal device $1_1$ and second user terminal device $1_2$, authentication of each user that uses biometrics data, verification of the validity of registration data and inquiry data used in authentication, and transmission and reception of data that have been encrypted among each of the user terminal devices using public-key cryptography realized by PKI. First user terminal device $1_1$, second user terminal device $1_2$, and PKI server device 4 are connected so as to allow intercommunication by way of network 5 such as the Internet. A configuration is shown in FIG. 1 in which one PKI server device 4 is connected to network 5, but PKI server device 4 may be of a configuration that realizes various functions by means of a plurality of server devices.

PKI server device 4 is an information processor such as a workstation/server computer that is provided with communication capabilities for connecting to network 5, and is managed by, for example, a service provider that manages the data communication system of the present invention, or by a third party that is entrusted by the company with the operation of the data communication system. First user terminal device $1_1$ and second user terminal device $1_2$ are information processors such as personal computers, PDAs (Personal Digital (Data) Assistants) or portable telephones provided with communication capabilities for connecting to network 5. Biometrics acquisition device $2_1$ for acquiring biometrics data of users is connected to first user terminal device $1_1$, and biometrics acquisition device $2_2$ is connected to second user terminal device $1_2$.

As shown in FIG. 2, PKI server device 4 is of a configuration that includes: processor 10 for executing processes in accordance with programs, input device 20 for applying input such as commands and data to processor 10, and output device 30 for monitoring the processing results of processor 10.

Processor 10 is of a configuration provided with: CPU 11, main memory device 12 for temporarily holding data necessary for the processing of CPU 11, data storage device 14 for storing information such as PKI keys and biometrics data of each user, recording medium 13 in which are stored control programs for causing CPU 11 to execute processes of the present invention, memory control interface unit 15 for controlling the transfer of data between CPU 11 and main memory device 12, recording medium 13, and data storage device 14, I/O interface unit 16 that is the interface device with input device 20 and output device 30, and communication control device 17 that is the interface for controlling communication by way of the network; these components each being connected by way of bus 18.

Processor 10 executes processes of the present invention that are to be described hereinbelow in accordance with a control program that has been recorded in recording medium 13. Recording medium 13 may be a magnetic disk, a semiconductor memory, an optical disk, or another recording medium.

First user terminal device $1_1$ and second user terminal device $1_2$ are of a configuration that is basically the same as the configuration of PKI server device 4 with the exception of: the provision of biometrics acquisition device, and moreover, differences in the information stored in data storage device. Accordingly, detailed explanation of this configuration is here omitted.

As shown in FIG. 1, PKI server device 4 is of a configuration provided with authentication unit 6 for implementing a user authentication process using data received from first user terminal device $1_1$ and second user terminal device $1_2$, and PKI processor 7 for transmitting and receiving data that have been encrypted between user terminal devices using public-key cryptography by means of PKI; the functions of authentication unit 6 and PKI processor 7 being realized by the above-described processor 10. Data storage device 14 of PKI server device 4 is provided with: biometrics database $6_1$ in which the biometrics data of each user are registered and biometrics data lapsed list $6_2$ in which are registered biometrics data for which validity has been lost and that therefore cannot be used, this database and list being used in the above-described authentication unit 6; and repository $7_1$ in which are stored PKI public keys used when transmitting or receiving data with each user terminal device, and PKI secret key storage unit $7_2$ in which are stored PKI secret keys, this repository and storage unit being used in the above described PKI processor 7.

As described in the foregoing explanation, biometrics acquisition devices $2_1$ and $2_2$ for acquiring the biometrics data of users are connected to first user terminal device $1_1$ and second user terminal device $1_2$, respectively; and in memory devices $3_1$ and $3_2$ in the biometrics acquisition devices are stored, for example: inquiry data, registration data, PKI keys that are used when transmitting data to and receiving data from a PKI server device, and the common secret keys that are used when receiving data from the user terminal device that is the communication partner. The inquiry data, registration data, PKI keys and common secret keys may also be stored in the data storage devices that belong to first user terminal device $1_1$ and second user terminal device $1_2$.

Figure 3:
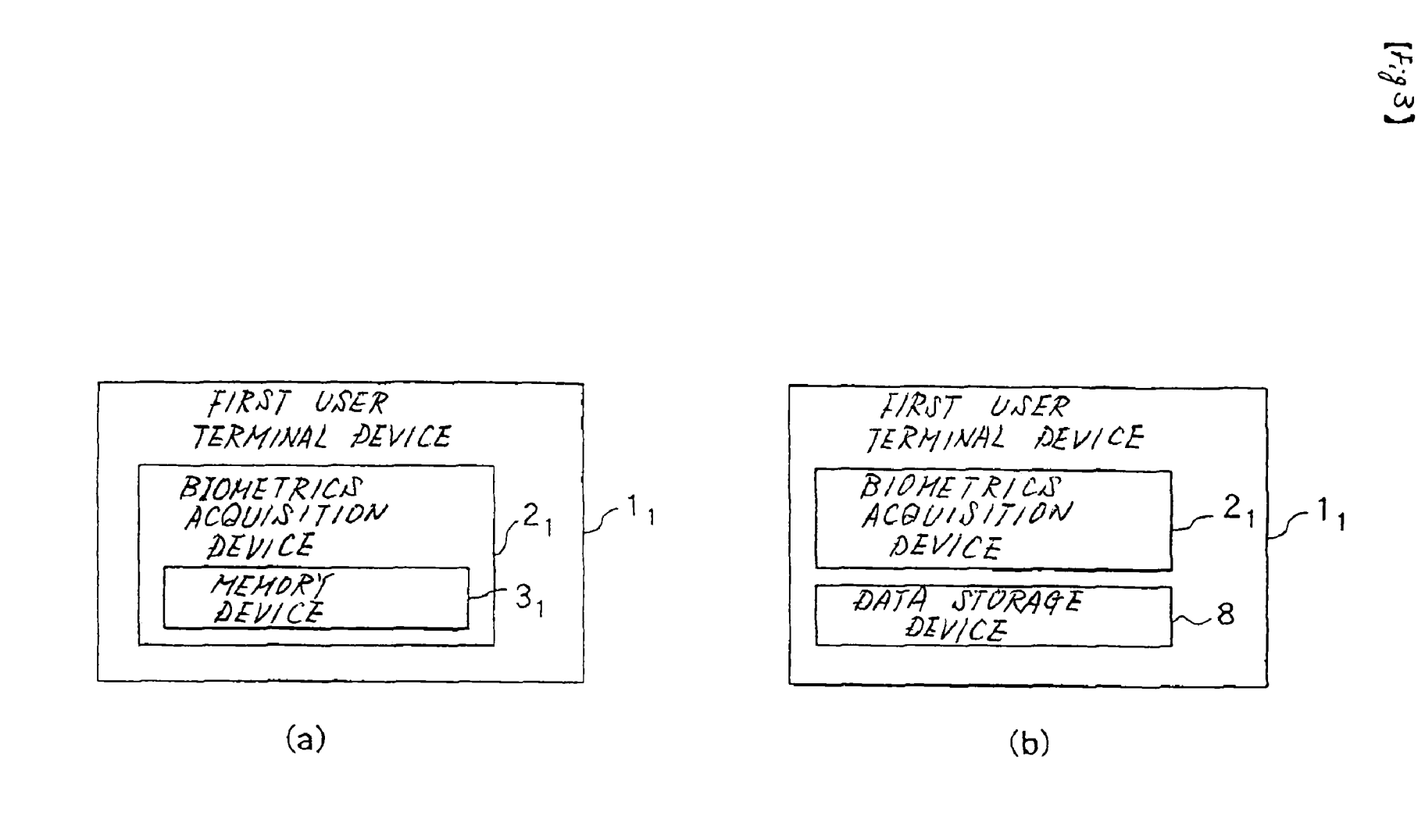
FIG. 3 is a block diagram showing another example of the configuration of the first user terminal device shown in FIG. 1.

As shown in FIG. 3, biometrics acquisition devices $2_1$ and $2_2$ may also be incorporated in first user terminal device $1_1$ and second user terminal device $1_2$, respectively. In this case, inquiry data, registration data, PKI keys and common secret keys may be stored in memory devices in biometrics acquisition devices $2_1$ and $2_2$ (see FIG. 3(a)), or may be stored in data storage device 8 that belongs to first user terminal device $1_1$ and second user terminal device $1_2$ (see FIG. 3(b)). FIG. 3 shows only a modification of first user terminal device $1_1$.

The inquiry data, registration data, PKI keys, and common secret keys may also be stored on another external recording medium that can be connected to each user terminal device such as: an IC card, a hard disk device, a floppy disk, a CD (Compact Disk), a magneto-optic disk, a DVD (Digital Video Disk), a USB (Universal Serial Bus) memory, an SD memory card, or a memory stick.

In this case, PKI public key A is the public key that is used when transmitting data from PKI server device 4 to first user terminal device $1_1$ used by user A, PKI public key B is the public key used when transmitting data to second user terminal device $1_2$ used by user B, and PKI public key S is the public key used when transmitting data to PKI server device 4 from first user terminal device $1_1$ and second user terminal device $1_2$. In addition, PKI secret key A is the secret key used when decoding data that have been transmitted from PKI server device 4 to first user terminal device $1_1$ that is used by user A, PKI secret key B is the secret key used when decoding data that have been transmitted from PKI server device 4 to second user terminal device $1_2$ used by user B, and PKI secret key S is the secret key used when decoding data that have been transmitted to PKI server device 4 from first user terminal device $1_1$ and second user terminal device $1_2$.

Further, common secret key KA is the secret key used when decoding data that have been transmitted from second user terminal device $1_2$ to first user terminal device $1_1$, and common secret key KB is the secret key used when decoding data that have been transmitted from first user terminal device $1_1$ to second user terminal device $1_2$.

Figure 4:
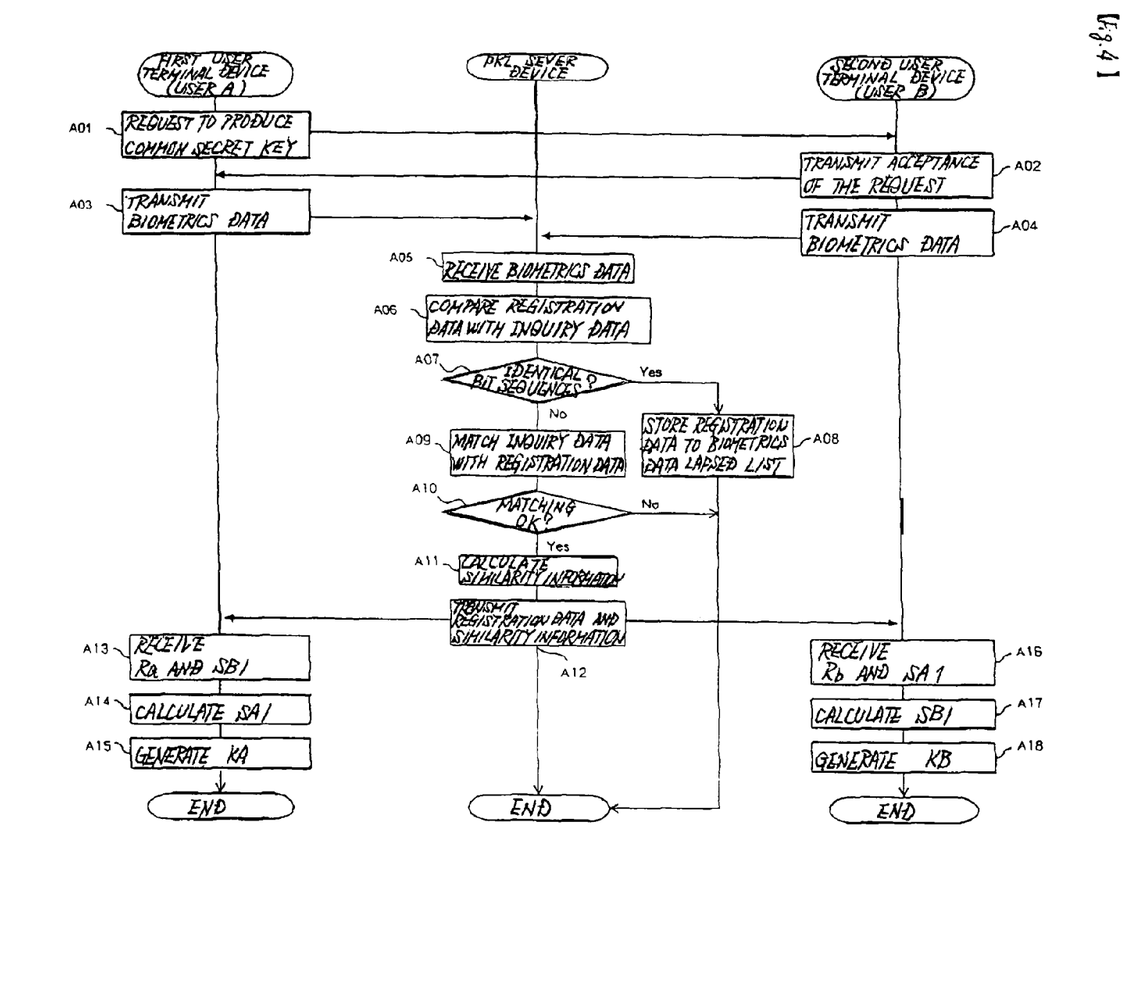
FIG. 4 is a flow chart showing the succession of processes of the first embodiment of the data communication system of the present invention.

Using FIG. 4, the following explanation regards the succession of processes of the data communication method of the first embodiment shown in FIG. 1.

As shown in FIG. 4, in the first embodiment, before the transmission and reception of data between user A and user B, one user such as user A carries out operations for transmitting a request to produce a common secret key from first user terminal device $1_1$ to second user terminal device $1_2$ that belongs to user B (Step A01). At second user terminal device $1_2$, upon receiving the request to produce a common secret key from first user terminal device $1_1$, user B implements operations to respond with an acceptance of the request to first user terminal device $1_1$ (Step A02).

At first user terminal device $1_1$, user A next implements operations to use biometrics acquisition device $2_1$ to acquire biometrics data of user A, and biometrics data (inquiry data) Ma are both stored in a prescribed memory device and transmitted to PKI server device 4 with appended information of user A and the communication partner (user B) (Step A03). At this time, first user terminal device $1_1$ may use PKI public key S to encrypt data that are transmitted to conceal inquiry data Ma of user A.

Similarly, in second user terminal device $1_2$ that has accepted the request to produce a common secret key, user B implements operations to use biometrics acquisition device $2_2$ to acquire the biometrics data of user B, and the biometrics data (inquiry data) Mb are stored in a prescribed memory device, and further, the biometrics data (inquiry data) Mb are transmitted to PKI server device 4 with appended information of user B and the communication partner (user A) (Step A04). At this time, second user terminal device $1_2$ may use PKI public key S to encrypt the data that are transmitted to conceal inquiry data Mb of user B.

Upon receiving the biometrics data of user A from first user terminal device $1_1$ (Step A05), PKI server device 4 first determines whether the received data have been encrypted or not. If the received data have been encrypted, PKI server device 4 uses PKI secret key S to decode the received data.

Upon acquiring inquiry data Ma of user A by decoding, PKI server device 4 reads registration data Ra of user A that have been registered in biometrics database $6_1$, compares this registration data Ra with inquiry data Ma that have been received (Step A06), and determines whether the bit sequence are absolutely identical or not (Step A07).

If the registration data Ra and the inquiry data Ma are absolutely identical bit sequences, PKI server device 4 determines that inquiry data Ma that have been transmitted from first user terminal device $1_1$ as described above are data that have been stolen in the past, i.e., determines that this is an access from a third party other than user A, and therefore stores the registration data Ra of user A to biometrics data lapsed list $6_2$ (Step A08) and ends the process. If registration data Ra and inquiry data Ma are different bit sequences, PKI server device 4 matches inquiry data Ma with registration data Ra (Step A09).

PKI server device 4 also uses PKI secret key S as necessary to decode for inquiry data Mb of user B that is received from second user terminal device $1_2$. PKI server device 4 then compares inquiry data Mb and registration data Rb to determine whether these bit sequences are absolutely identical or not, and if they are identical, stores registration data Rb of user B to biometrics data lapsed list $6_2$ and ends the process. Alternatively, if registration data Rb and inquiry data Mb are different bit sequences, PKI server device 4 matches received inquiry data Mb with registration data Rb.

If the matching of user A results in success, i.e., if inquiry data Ma is recognized to be data of user A (Step A10), PKI server device 4 calculates similarity information SA1 indicating the degree of similarity based on registration data Ra and inquiry data Ma of user A (Step A11). When matching results in failure, PKI server device 4 ends the process. The calculation of similarity information may use values (hereinbelow referred to as "score information") obtained by adding up the "pairing strengths" for each prescribed feature point disclosed in, for example "Automated fingerprint identification by minutiae-network features—Matching process," in Transactions of IEICE D-II, J72-D-II, 5, pp. 733-740, May 1989 (in Japanese).

More specifically, where SA1$rr$ is the score information for the registration data Ra of user A compared to itself, SA1$mm$ is the score information for inquiry data Ma of user A compared to itself, and SA1$rm$ is the score information for registration data Ra and inquiry data Ma of user A, the similarity information SA1 of user A is calculated using a prescribed function F1 by:

$$SA1=F1(SA1rr, SA1mm, SA1rm)$$

The method of calculating similarity information SA1 is not limited to the above-described method, and similarity information SA1 may be also calculated using the registration data Ra and the inquiry data Ma of user A by another known method, and the value that has been found may be further converted to another value using a prescribed function.

PKI server device 4 similarly calculates similarity information SB1 based on the registration data Rb and inquiry data Mb of user B when matching of user B results in success, i.e., when inquiry data Rb is recognized as that of user B. When matching results in failure, PKI server device 4 terminates the process.

As with the above-described method of calculating similarity information SA1 of user A, similarity information SB1 of user B is calculated using a prescribed function F1 from:

$$SB1=F1(SB1rr, SB1mm, SB1rm)$$

where SB1$rr$ is the score information for registration data Rb of user B compared to itself, SB1$mm$ is the score information of inquiry data Mb of user B compared to itself, and SB1$rm$ is the score information of the registration data Rb and inquiry data Mb of user B.

Having calculated similarity information SA1 and SB1, PKI server device 4 uses PKI public key A to encrypt registration data Ra of user A and similarity information SB1 of user B, and transmits the result to first user terminal device $1_1$. In addition, PKI server device 4 uses PKI public key B to encrypt registration data Rb of user B and similarity information SA1 of user A and transmits the result to second user terminal device $1_2$ (Step A12).

First user terminal device $1_1$ uses PKI secret key A to decode the data that have been received from PKI server device 4, and thus acquires each of the registration data Ra of user A and similarity information SB1 of user B (Step A13). First user terminal device $1_1$ then uses registration data Ra of user A and the inquiry data Ma of user A that have been stored in a prescribed memory device to calculate similarity information SA2 (Step A14).

Similar to PKI server device 4, similarity information SA2 is calculated using a prescribed function F1 from:

$$SA2=F1(SA1rr,SA1mm,SA1rm)$$

where, for example, SA1$rr$ is the score information for registration data Ra of user A compared with itself, SA1$mm$ is the score information of inquiry data Ma of user A compared with itself, and SA1$rm$ is the score information for registration data Ra and inquiry data Ma of user A. Common secret key KA, which is used in the transmission and reception of data with second user terminal device $1_2$, is generated based on this similarity information SA2 and similarity information SB1 of user B that have been received from PKI server device 4 (Step A15). Common secret key KA is generated using similarity information SA2 and SB1 by means of a prescribed function F2 (SA2, SB1).

Similarly, second user terminal device $1_2$ uses PKI secret key B to decode data that have been received from PKI server device 4 and acquires each of registration data Rb of user B and similarity information SA1 of user A (Step A16). Second user terminal device $1_2$ then uses registration data Rb of user B and inquiry data Mb of user B that have been stored in a prescribed memory device to calculate similarity information SB2 (Step A17).

Similar to PKI server device 4, similarity information SB2 is calculated using a prescribed function F1 from:

$$SB2=F1(SB1rr,SB1mm,SB1rm)$$

where, for example, SB1$rr$ is the score information for registration data Rb of user B compared with itself, SB1$mm$ is score information for inquiry data Mb of user B compared with itself, and SB1$rm$ is the score information for registration data Rb and inquiry data Mb of user B. Common secret key KB, which is used in the transmission and reception of data with first user terminal device $1_1$, is generated based on this similarity information SB2 and similarity information SA1 of user A that has been received from PKI server device 4 (Step A18). Common secret key KB is generated using similarity information SB2 and SA1 from a prescribed function F2 (SA1, SB2).

Here, if the same function F1 and function F2 are used in each of user terminal devices $1_1$ and $1_2$, and moreover, if there has been no corruption of data that have been transmitted and received in each of user terminal devices $1_1$ and $1_2$, common secret key KA and common secret key KB will be equal. Accordingly, a common secret key is generated that can be used only in first user terminal device $1_1$ and second user terminal device $1_2$.

First user terminal device $1_1$ subsequently transmits data that have been encrypted using common secret key KA to second user terminal device $1_2$, and second user terminal device $1_2$ uses common secret key KB to decode the received data. Similarly, second user terminal device $1_2$ transmits data that have been encrypted using common secret key KB to first user terminal device $1_1$, and first user terminal device $1_1$ uses common secret key KA to decode the received data. As a result, first user terminal device $1_1$ and second user terminal device $1_2$ are able to transmit and receive data by means of a public-key cryptography that uses a common secret key that is concealed.

According to the data communication method and system of the present embodiment, user terminal devices that transmit and receive data both use each of the items of similarity information that are obtained from biometrics data to each generate a common secret key, whereby the common secret key need not be released onto network 5. The risk of interception of the key on network 5 is therefore reduced.

In addition, the biometrics data have bit sequences that differ with each extraction, and the common secret key that is generated based on biometrics data therefore also differs with each communication and has validity only as a one-time key. Public-key cryptography that uses this common secret key can therefore realize an improved level of security in communication.

Second Embodiment

Explanation next regards the second embodiment of the data communication method and system of the present invention with reference to the accompanying figures.

The second embodiment is of a configuration in which biometrics data (registration data) have been registered in advance not only in the PKI server device, but also in each of user terminal devices $1_1$ and $1_2$ or in biometrics acquisition devices $2_1$ and $2_2$. As a result, the second embodiment differs from the first embodiment in that registration data are not transmitted from PKI server device 4 to each of user terminal devices $1_1$ and $1_2$. The configuration of the data communication system is similar to that of the first embodiment, and explanation of the system is therefore here omitted.

Figure 5:
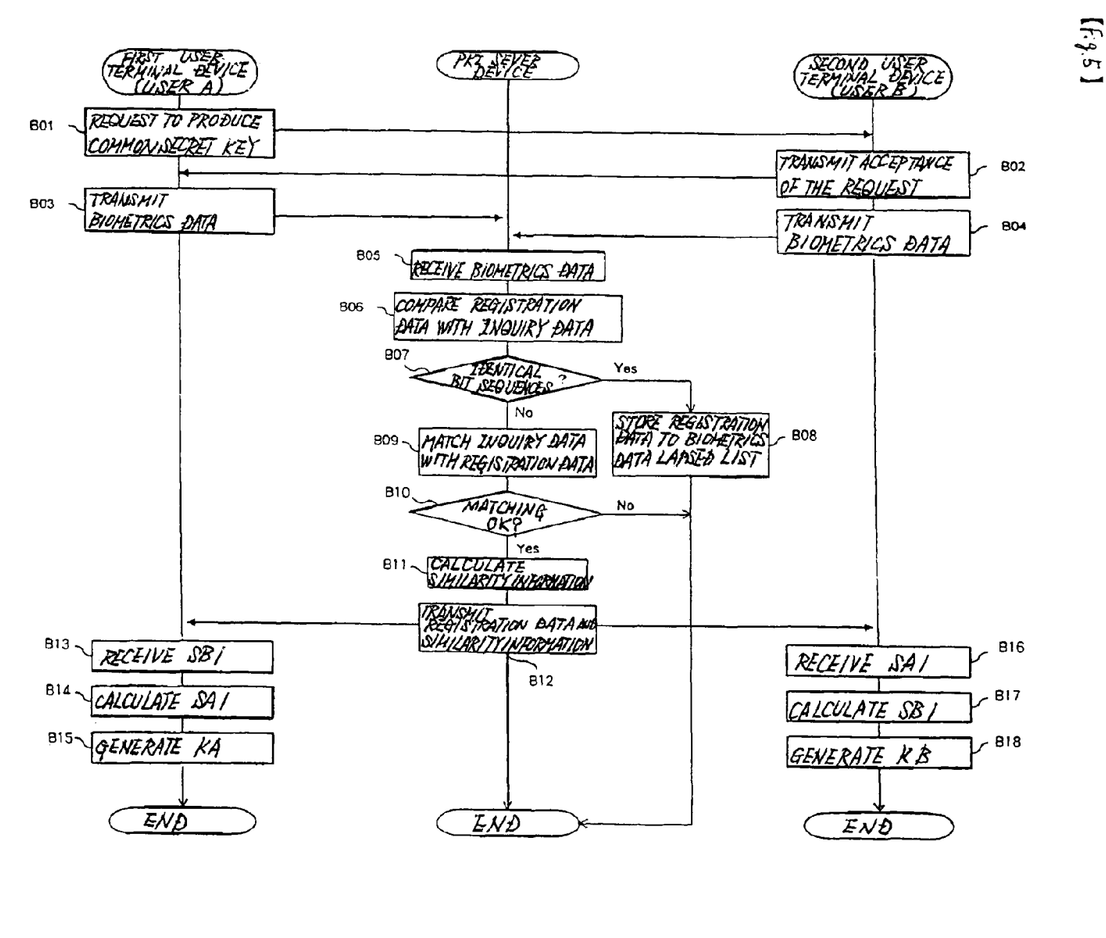
FIG. 5 is a flow chart showing the succession of processes of the second embodiment of the data communication system of the present invention.

FIG. 5 is a flow chart showing the succession of processes of the second embodiment of the data communication method of the present invention.

As shown in FIG. 5, in the second embodiment, before the transmission and reception of data of user A and user B, a user such as user A implements operations to transmit a request from first user terminal device $1_1$ to second user terminal device $1_2$ that belongs to user B to produce a common secret key (Step B01). Upon receiving the request to produce a common secret key from first user terminal device $1_1$, user B implements operations in second user terminal device $1_2$ to return an acceptance of the request to first user terminal device $1_1$ (Step B02).

User A next implements operations in first user terminal device $1_1$ such that biometrics acquisition device $2_1$ is used to acquire biometrics data of user A, and biometrics data (inquiry data) Ma are both stored in a prescribed memory device and transmitted to PKI server device 4 with information of user A and the communication partner (user B) appended (Step B03). At this time, first user terminal device $1_1$ may use PKI public key S to encrypt data that are transmitted to conceal inquiry data Ma of user A.

Similarly, in second user terminal device $1_2$ that has accepted the request to produce a common secret key, user B implements operations such that biometrics acquisition device $2_2$ is used to acquire the biometrics data of user B, and biometrics data (inquiry data) Mb are both stored in a prescribed memory device and transmitted to PKI server device 4 with information of user B and the communication partner (user A) appended (Step B04). At this time, second user terminal device $1_2$ may use PKI public key S to encrypt the transmitted data to conceal inquiry data Mb of user B.

Upon receiving the biometrics data of user A from first user terminal device $1_1$ (Step B05), PKI server device 4 first determines whether the received data have been encrypted or not. If the received data have been encrypted, PKI server device 4 uses PKI secret key S to decode the received data.

Upon acquiring inquiry data Ma of user A by decoding, PKI server device 4 reads registration data Ra of user A that have been registered in advance in biometrics database $6_1$, compares this registration data Ra with inquiry data Ma that have been received (Step B06), and determines whether the bit sequences are absolutely identical or not (Step B07).

When registration data Ra and inquiry data Ma are here absolutely identical bit sequences, PKI server device 4: determines that inquiry data Ma that have been transmitted from first user terminal device $1_1$ as previously described are data that have been stolen in the past, i.e., that this is an access from a third party other than user A; stores registration data Ra of user A to biometrics data lapsed list $6_2$ (Step B08); and ends the process. When registration data Ra and inquiry data Ma are different bit sequences, PKI server device 4 matches inquiry data Ma and registration data Ra (Step B09).

PKI server device 4 also uses PKI secret key S as necessary to carry out decoding for inquiry data Mb of user B that have been received from second user terminal device $1_2$. PKI server device 4 then compares inquiry data Mb with registration data Rb to determine whether these bit sequences are absolutely identical, and if the bit sequences are the same, stores registration data Rb of user B to biometrics data lapsed list $6_2$ and ends the process. Alternatively, if the bit sequences are not identical, PKI server device 4 matches inquiry data Mb that has been received with registration data Rb.

When the matching of user A results in success, i.e., when inquiry data Ra are recognized to be that of user A (Step B10), PKI server device 4 calculates similarity information SA1 from registration data Ra of user A and inquiry data Ma (Step B11). At this time, similarity information SA1 of user A is calculated by using prescribed function F1 (SA1$rr$, SA1$mm$, SA1$rm$), as in the first embodiment (Step B09). When matching results in failure, PKI server device 4 ends the process.

Similarly, when matching results in success, i.e., when inquiry data Rb is recognized to be data of user B, PKI server device 4 calculates similarity information SB1 from registration data Rb of user B and inquiry data Mb. At this time, PKI server device 4 uses a prescribed function F1 (SB1$rr$, SB1$mm$, SB1$rm$) to calculate similarity information SB1 of user B as in the first embodiment. When matching results in a failure, PKI server device 4 ends the process.

PKI server device 4, having calculated similarity information SA1 and SB1, uses PKI public key A to encrypt similarity information SB1 of user B, and transmits the result to first user terminal device $1_1$ (Step B12). PKI server device 4 further uses PKI public key B to encrypt similarity information SA1 of user A and transmits the result to second user terminal device $1_2$.

First user terminal device $1_1$ uses PKI secret key A to decode the data that have been received from PKI server device 4 and thus acquires similarity information SB1 of user B (Step B13). First user terminal device $1_1$ then uses registration data Ra of user A that have been stored in advance in a prescribed memory device and inquiry data Ma of user A to calculate similarity information SA2 (Step B14).

As in the first embodiment, similarity information SA2 is calculated using a prescribed function F1 (SA1$rr$, SA1$mm$, SA1$rm$). Common secret key KA that is used for transmitting and receiving data with second user terminal device $1_2$ is generated based on this similarity information SA2 and similarity information SB1 of user B that has been received from the PKI server device (Step B15). As in the first embodiment, similarity information SA2 and SB1 are used to generate common secret key KA using a prescribed function F2 (SA2, SB1).

Similarly, second user terminal device $1_2$ uses PKI secret key B to decode data that have been received from PKI server device 4 and thus acquires similarity information SA1 of user A (Step B16). Second user terminal device $1_2$ then uses registration data Rb of user B that have been stored in advance in a prescribed memory device and inquiry data Mb of user B to calculate similarity information SB2 (Step B17).

Similarity information SB2 is calculated using a prescribed function F1 (SB1$rr$, SB1$mm$, SB1$rm$) as in the first embodiment. Common secret key KB that is used in the transmission and reception of data with first user terminal device $1_1$ is generated based on this similarity information SB2 and similarity information SA1 of user A that has been received from PKI server device 4 (Step B18). As in the first embodiment, similarity information SB2 and SA1 are used to generate common secret key KB using a prescribed function F2 (SA1, SB2).

Here, if the same function F1 and function F2 are used in each of user terminal devices $1_1$ and $1_2$, and moreover, there is no corruption of the data that are transmitted and received in each of user terminal devices $1_1$ and $1_2$, common secret key KA and common secret key KB will be equal. Accordingly, common secret keys are generated that can be used only in first user terminal device $1_1$ and second user terminal device $1_2$, as in the first embodiment.

First user terminal device $1_1$ subsequently transmits data that have been encrypted using common secret key KA to second user terminal device $1_2$, and second user terminal device $1_2$ uses the common secret key KB to decode the received data. In the same way, second user terminal device $1_2$ transmits data that have been encrypted by common secret key KB to first user terminal device $1_1$, and first user terminal device $1_1$ uses common secret key KA to decode the data that have been received. As a result, first user terminal device $1_1$ and second user terminal device $1_2$ can transmit and receive data by means of public-key cryptography using common secret keys that have been concealed.

According to the data communication method and system of the present embodiment, biometrics data (registration data) of users are registered in advance in user terminal devices or biometrics acquisition devices to eliminate the need for releasing registration data onto a network, whereby, in addition to the same effect of the first embodiment, the danger of interception of registration data by a third party is reduced.

Third Embodiment

Explanation next regards the third embodiment of the data communication method and system of the present invention with reference to the accompanying figures.

In the third embodiment, biometrics data of users (registration data) are registered in advance in first user terminal device $1_1$ and second user terminal device $1_2$ (or biometrics acquisition devices $2_1$ and $2_2$), inquiry data are matched with registration data in each of user terminal device $1_1$ and $1_2$, and registration data and inquiry data are transmitted to PKI server device 4 when matching is successful. PKI server device 4 then, based on the bit sequences of inquiry data and registration data that have been transmitted from user terminal devices $1_1$ and $1_2$, authenticates the users that have transmitted these data. The configuration of the data communication system is identical to that of the first embodiment, and explanation of this configuration is therefore here omitted.

Figure 6:
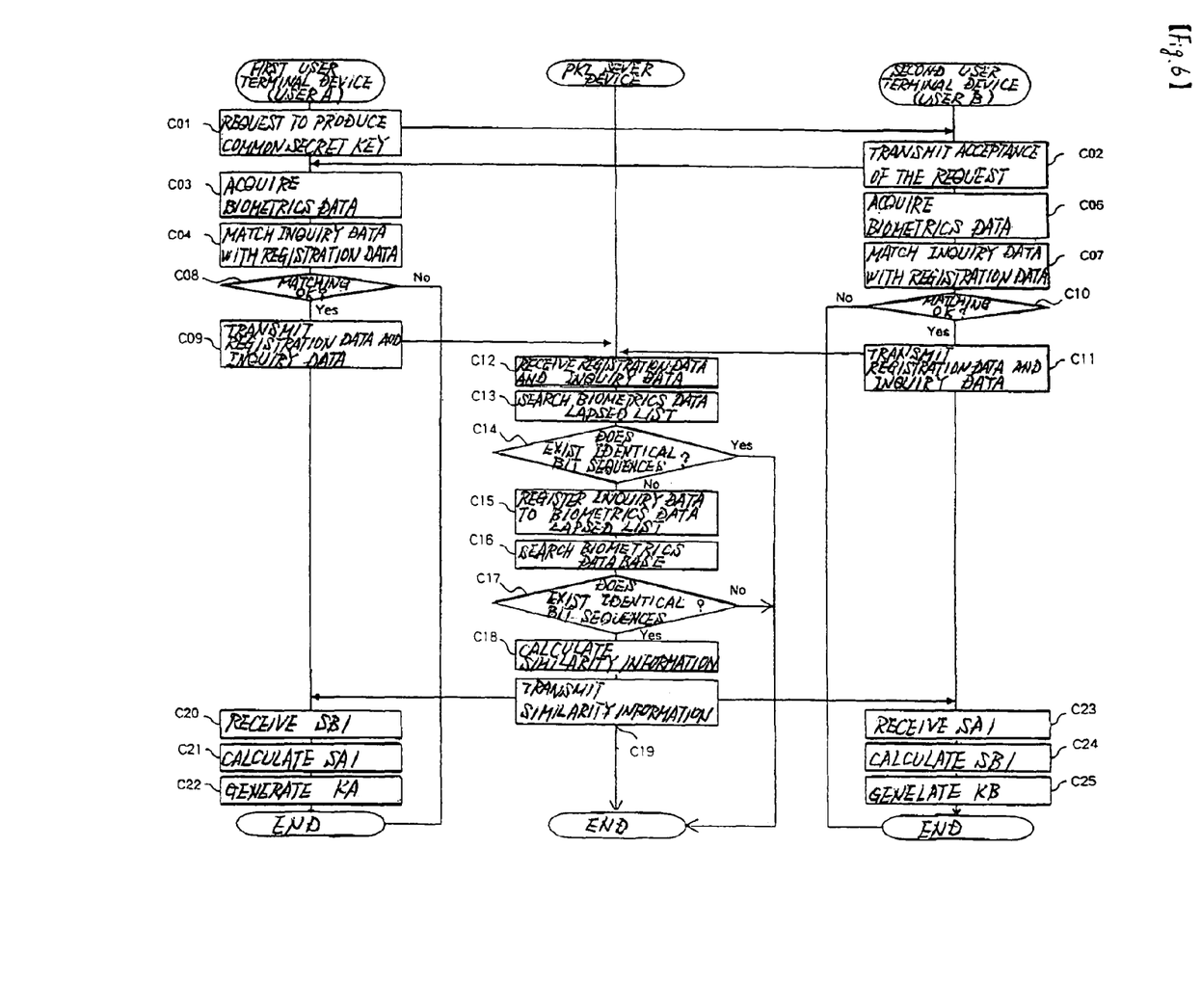
FIG. 6 is a flow chart showing the succession of processes of the third embodiment of the data communication system of the present invention.

FIG. 6 is a flow chart showing the succession of processes of the third embodiment of the data communication method of the present invention.

As shown in FIG. 6, in the third embodiment, before transmitting and receiving data of user A and user B, one user such as user A implements operations to transmit a request from first user terminal device $1_1$ to second user terminal device $1_2$ that belongs to user B to produce a common secret key (Step C01). When second user terminal device $1_2$ receives the request from first user terminal device $1_1$ to produce a common secret key, user B implements operations to return an acceptance of the request to first user terminal device $1_1$ (Step C02).

In first user terminal device $1_1$, user A next implements operations to use biometrics acquisition device $2_1$ to acquire the biometrics data of user A (Step C03), whereby biometrics data (inquiry data) Ma are both stored in a prescribed memory device and matched with registration data Ra that have been stored in advance in the memory device (Step C04). If matching results in success, i.e., if inquiry data Ma are recognized to be of user A (Step C08), first user terminal device $1_1$ transmits registration data Ra, inquiry data Ma, and the information of user A and the communication partner (user B) to PKI server device 4 (Step C09). At this time, first user terminal device $1_1$ may use PKI public key S to encrypt the data that are transmitted to conceal these items of information relating to user A. If matching results in failure, first user terminal device $1_1$ ends the process.

Similarly, in second user terminal device $1_2$ that has accepted the request to produce a common secret key, user B implements operations to use biometrics acquisition device $2_2$ to acquire biometrics data of user B (Step C06) and both store these biometrics data (inquiry data) Mb in a prescribed memory device and match with registration data Rb that have been stored in advance in the memory device (Step C07). If matching results in success, i.e., if inquiry data Mb are recognized to be data of user B (Step C10), second user terminal device $1_2$ transmits registration data Rb, inquiry data Mb, and information of user B and the communication partner (user A) to PKI server device 4 (Step C11). At this time, second user terminal device $1_2$ may use PKI public key S to encrypt these data that are transmitted to conceal the information that relates to user B. If matching results in failure, second user terminal device $1_2$ ends the process.

Upon receiving information that contains inquiry data Ma and registration data Ra of user A from first user terminal device $1_1$ (Step C12), PKI server device 4 first determines whether the received data have been encrypted or not. If the received data have been encrypted, PKI server device 4 uses PKI secret key S to decode the received data.

Upon acquiring registration data Ra and inquiry data Ma of user A by decoding, PKI server device 4 first searches biometrics data lapsed list $6_2$ (Step C13), and determines whether data exist that have bit sequences absolutely identical to received inquiry data Ma (Step C14). If data exist in biometrics data lapsed list $6_2$ having bit sequences absolutely identical to inquiry data Ma, PKI server device 4 determines that inquiry data Ma received from first user terminal device $1_1$ are fraudulent and terminates the process. If data in which bit sequence absolutely identical to inquiry data Ma is not present, PKI server device 4 registers these inquiry data Ma in biometrics data lapsed list $6_2$ to prevent access (posing) that uses these inquiry data Ma (Step C15).

PKI server device 4 next searches within biometrics database $6_1$ (Step C16), and determines whether data in which bit sequence absolutely identical to the received registration data Ra is present (Step C17). If data in which bit sequence absolutely identical to registration data Ra do not exist in biometrics database $6_1$, PKI server device 4 determines that the access from first user terminal device $1_1$ is not access of user A (failure of personal authentication) and terminates the process.

If data in which bit sequence absolutely identical to registration data Ra is present in biometrics database $6_1$, PKI server device 4 determines that the received registration data Ra and inquiry data Ma are the data of user A (success of personal authentication) and calculates similarity information SA1 of user A as in the first embodiment (Step C18).

PKI server device 4 carries out the same processes as described above (Step C12-Step C18) for data that are received from second user terminal device $1_2$, determines that received registration data Rb and inquiry data Mb are data of user B, and if the personal authentication succeeds, calculates similarity information SB1 of user B as in the first embodiment.

PKI server device 4, having calculated similarity information SA1 and SB1, uses PKI public key A to encrypt similarity information SB1 of user B that has been calculated and transmits the result to first user terminal device $1_1$ (Step C19). PKI server device 4 further uses PKI public key B to encrypt similarity information SA1 of user A and transmits the result to second user terminal device $1_2$.

First user terminal device $1_1$ uses PKI secret key A to decode the data that have been received from PKI server device 4 and thus acquires similarity information SB1 of user B (Step C20). First user terminal device $1_1$ then uses inquiry data Ma of user A and registration data Ra of user A that have been stored in advance in a prescribed memory device to calculate similarity information SA2 (Step C21).

Similarity information SA2 is calculated using a prescribed function F1 (SA1*rr*, SA1*mm*, SA1*rm*) as in the first embodiment. Common secret key KA that is used in first user terminal device $1_1$ is generated based on this similarity information SA2 and similarity information SB1 of user B that has been received from the PKI server device (Step C22). Common secret key KA is generated by means of prescribed function F2 (SA2, SB1) using similarity information SA2 and SB1 as in the first embodiment.

In the same way, second user terminal device $1_2$ uses PKI secret key B to decode data that have been received from PKI server device 4 and thus acquires similarity information SA1 of user A (Step C23). Second user terminal device $1_2$ then uses inquiry data Mb of user B and registration data Rb of user B that have been stored in advance in a prescribed memory device to calculate similarity information SB2 (Step C24).

Similarity information SB2 is calculated using a prescribed function F1 (SB1*rr*, SB1*mm*, SB1*rm*) as in the first embodiment. Common secret key KB that is used in second user terminal device $1_2$ is generated based on this similarity information SB2 and similarity information SA1 of user A that has been received from PKI server device 4 (Step C25). Common secret key KB is generated by means of a prescribed function F2 (SA1, SB2) using similarity information SB2 and SA1, as in the first embodiment.

In this case, if the same function F1 and function F2 are used in each of user terminal devices $1_1$ and $1_2$, and moreover, data that are transmitted and received in each of user terminal devices $1_1$ and $1_2$ have not been corrupted, common secret key KA and common secret key KB will be equivalent. Accordingly, common secret keys are generated that can be used only in first user terminal device $1_1$ and second user terminal device $1_2$, as in the first embodiment.

First user terminal device $1_1$ subsequently transmits data that have been encrypted using common secret key KA to second user terminal device $1_2$, and second user terminal device $1_2$ uses common secret key KB to decode the data that have been received. Similarly, second user terminal device $1_2$ transmits data that have been encrypted using common secret key KB to first user terminal device $1_1$, and first user terminal device $1_1$ uses common secret key KA to decode the data that have been received. As a result, first user terminal device $1_1$ and second user terminal device $1_2$ are able to transmit and receive data realized by public-key cryptography that uses common secret keys that have been concealed.

According to the data communication method and system of the third embodiment, in addition to the same effects as the first embodiment, the authentication accuracy of users can be improved and posing by a third party having malicious intent can be more reliably prevented because the authentication of users is carried out in PKI server device 4 based on the bit sequences of registration data and inquiry data that have been transmitted from user terminal devices $1_1$ and $1_2$.

Fourth Embodiment

Explanation next regards the fourth embodiment of the data communication method and system of the present invention with reference to the accompanying figures.

In the fourth embodiment, as in the third embodiment, biometrics data (registration data) of users are registered in advance in first user terminal device $1_1$ and second user terminal device $1_2$ (or in biometrics acquisition devices $2_1$ and $2_2$), inquiry data are matched with registration data in each of user terminal devices $1_1$ and $1_2$, and the registration data and inquiry data are transmitted to PKI server device 4 when matching is successful. PKI server device 4 authenticates users for which these data have been transmitted based on the bit sequences of the inquiry data and registration data that have been transmitted from each of user terminal device $1_1$ and $1_2$.

The fourth embodiment is an example of a configuration that enables operation similar to the third embodiment for cases in which the registration data that have been registered in each of user terminal devices $1_1$ and $1_2$ are data of poor quality that cannot be used in matching. If the determination of whether the data are of poor quality is carried out, for example, at the time of registration of biometrics data to first user terminal device $1_1$ and second user terminal device $1_2$, and if a flag indicating poor quality is appended to registration data that have been determined to be of poor quality, the processing for determining whether data are of poor quality each time the registration data are read can be reduced. The configuration of the data communication system is the same as in the first embodiment and explanation of the configuration is therefore here omitted.

Figure 7:
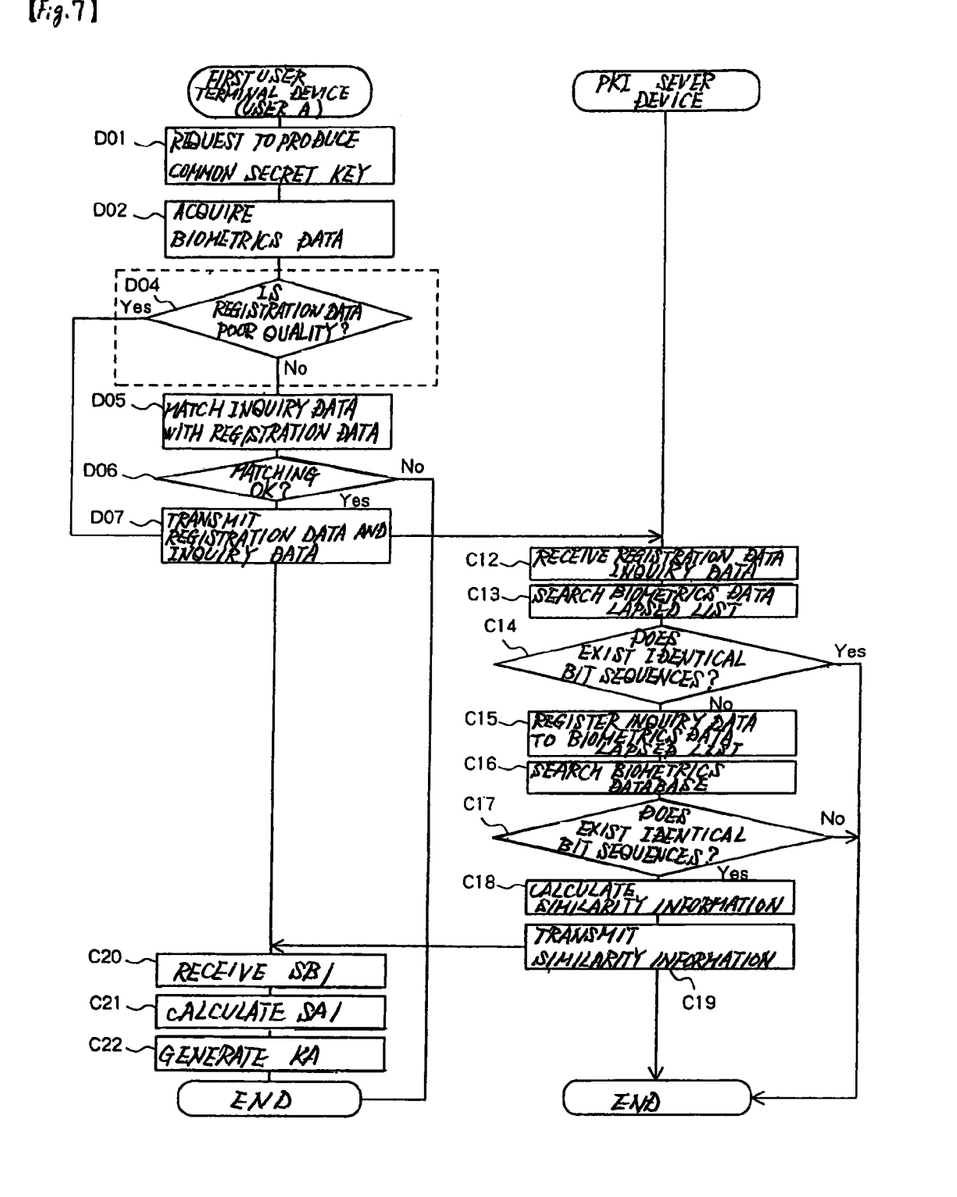
FIG. 7 is a flow chart showing the succession of processes of the fourth embodiment of the data communication system of the present invention.

FIG. 7 is a flow chart showing the succession of processes of the fourth embodiment of the data communication method of the present invention. FIG. 7 shows only the processes of first user terminal device $1_1$ and PKI server device 4, but second user terminal device $1_2$ executes the same processes as first user terminal device $1_1$ with the exception of the process of first responding to the request to produce a common secret key from first user terminal device $1_1$.

As shown in FIG. 7, in the fourth embodiment, before the transmission and reception of data of user A and user B, one user such as user A implements operations to transmit a request to produce a common secret key from first user terminal device $1_1$ to second user terminal device that belongs to user B (Step D01). Upon receiving the request to produce a common secret key from first user terminal device $1_1$, user B implements operations such that second user terminal device $1_2$ responds to first user terminal device $1_1$ with an acceptance of the request (not shown).

In first user terminal device $1_1$, user A next implements operations to use biometrics acquisition device $2_1$ to acquire biometrics data of user A (Step D02), and these biometrics data (inquiry data) Ma are stored in a prescribed memory device and the quality of registration data Ra stored in advance in the memory device is checked (Step D04). If registration data Ra are of quality that allows use in matching, inquiry data Ma that have been acquired by biometrics acquisition device $2_1$ are matched with the registration data Ra (Step D05). If matching results in success, i.e., if inquiry data Ma are recognized to be data of user A (Step D06), first user terminal device $1_1$ transmits registration data Ra, inquiry data Ma, and information of user A and the communication partner (user B) to PKI server device 4 (Step D07). In the present embodiment, moreover, even when registration data Ra are data of poor quality and thus cannot used in matching, the first user terminal device proceeds to the process of Step D07 and transmits registration data Ra, inquiry data Ma, and information of user A and the communication partner (user B) to PKI server device 4. At this time, first user terminal device $1_1$ may use PKI public key S to encrypt the data that are transmitted to conceal these data that relate to user A.

Similarly, in second user terminal device $1_2$ that has accepted the request to produce a common secret key, user B implements operations to use biometrics acquisition device $2_2$ to acquire biometrics data of user B, and the biometrics data (inquiry data) Mb are stored in the prescribed memory device and the quality of registration data Rb that have been stored in advance in the memory device is checked. If registration data Rb are of quality that can be used in matching, inquiry data Mb that have been acquired in the biometrics acquisition device are matched with registration data Rb. If matching results in success, i.e., if inquiry data Mb are recognized as data of user B, second user terminal device $1_2$ transmits registration data Rb, inquiry data Mb, and information of user B and the communication partner (user A) to PKI server device 4. Alternatively, even when registration data Rb are poor quality data that do not have quality for use in matching, second user terminal device $1_2$ transmits registration data Rb, inquiry data Mb, and information of user B and the communication partner (user A) to PKI server device 4. At this time, second user terminal device $1_2$ may also use PKI public key S to encrypt the data that are transmitted to conceal the information that relates to user B.

The subsequent processes are equivalent to the processes of Steps C12-C25 of the third embodiment shown in FIG. 6, and explanation of these processes is therefore here omitted.

According to the data communication method and system of the fourth embodiment, as in the third embodiment, PKI server device 4 authenticates the identity of a user based on the bit sequences of the registration data and inquiry data that are transmitted from each of user terminal devices $1_1$ and $1_2$, whereby the accuracy of authentication of users can be improved and posing as a user by a third party with malicious intent can be more reliably prevented. In addition, operation similar to the third embodiment can be realized even when registration data cannot be used to realize matching in each of user terminal devices $1_1$ and $1_2$.

Although examples were shown in the above-described first to fourth embodiments in which each of PKI server device 4, first user terminal device $1_1$, and second user terminal device $1_2$ were of a configuration realized by a processor that included a CPU for carrying out processing in accordance with programs, PKI server device 4, first user terminal device $1_1$, and second user terminal device $1_2$ are not limited to this configuration and may be of a configuration for realizing the same functions as described above by means of a plurality of LSI that include, for example, logic circuits and memory.

What is claimed is:

1. A data communication method, said data communication method being of the public-key cryptography type for both authenticating users that transmit and receive data by way of a network and for encrypting said data for transmission and reception; said data communication method comprising the steps of:

acquiring biometrics data of said users by using a biometrics acquisition device for acquiring biometrics data in which biological information of said users has been converted to numerical values;

transmitting biometrics data, that have been acquired as inquiry data for authenticating said users from user terminal devices used by said users, to a server device;

said server device, based on registration data which are biometrics data of said users that have been registered in advance in a database and said inquiry data that have been received from said user terminal devices, uses a prescribed function to calculate for each said user similarity information that indicates the degree of similarity between said inquiry data and said registration data; and said server device transmits to each user terminal device the registration data of the user that uses that user terminal device and the similarity information of the user that is the communication partner;

said user terminal device, based on registration data that have been received and inquiry data that have been acquired using said biometrics acquisition device, uses the same function as said server device to calculate its own user's similarity information that indicates the degree of similarity between said registration data and said inquiry data; and said user terminal device, based on its own user's similarity information that has been calculated and the similarity information of the user that is the communication partner that has been received from said server device, uses a common function for each of said user terminal devices to generate a common secret key for decoding data that have been encrypted and transmitted from the user terminal device of said communication partner.

2. The data communication method according to claim 1, wherein:

determining by means of said server device whether the bit sequences are absolutely identical for said inquiry data and said registration data;

when the bit sequences of said registration data and said inquiry data are different, matching said inquiry data with said registration data; and when said matching is successful, authenticating the user of the user terminal device that transmitted said inquiry data as actually said user.

3. The data communication method according to claim 2, wherein, when the bit sequences of said registration data and said inquiry data are determined by means of said server device to be absolutely identical, the registration data of the user that uses the user terminal device that transmitted said inquiry data are stored in a lapsed list in which contains stored biometrics data that cannot be used.

4. The data communication method according to claim 1, wherein:

biometrics data of the users that use said user terminal devices are stored in advance as registration data in a memory device that is provided in said user terminal devices;

said server device, based on said inquiry data and said registration data that have been received, uses a prescribed function to calculate similarity information indicating the degree of similarity between said inquiry data and said registration data for each of said users, and transmits to each user terminal device similarity information for each of the users that are communication partners;

each of said user terminal devices, based on registration data that have been stored in advance in said memory device and inquiry data that have been acquired using said biometrics acquisition device, uses the same function as said server device to calculate its own user's similarity information that indicates the degree of similarity between said registration data and said inquiry data; and each of said user terminal devices, based on its own user's similarity information that has been calculated and the similarity information of a user that is the communication partner and that has been received from said server device, uses a function that is common to each of said user terminal devices to generate a common secret key for decoding data that have been encrypted and transmitted from the user terminal device of said communication partner.

5. A data communication method, said data communication method being of the public-key cryptography type for both authenticating users that transmit and receive data by way of a network and for encrypting said data for transmission and reception; said data communication method comprising the steps of:

storing in advance biometrics data in which biological information of said users has been converted to numerical values as registration data in memory devices that are provided in user terminal devices used by said users;

using biometrics acquisition devices to acquire biometrics data of said users;

transmitting said registration data and inquiry data, which are biometrics data that have been acquired for authenticating said users from user terminal devices, that are used by the users, to a server device by way of a network;

determining by means of said server device whether data in which bit sequence absolutely identical to inquiry data that have been received from said user terminal devices is present in a lapsed list which contains registered biometrics data that cannot be used;

when data in which bit sequence absolutely identical to the inquiry data is not present in said lapsed list, determining whether data in which bit sequence absolutely identical to registered data that have been received is present in a database in which biometrics data for each user have been registered in advance; and when data in which bit sequence absolutely identical to the registration data is present in said database, authenticating the user of the user terminal device that has transmitted said registration data and said inquiry data as actually said user.

6. The data communication method according to claim 5, wherein, when data in which bit sequence absolutely identical to inquiry data that have been received from said user terminal devices is not present in said lapsed list, the inquiry data is stored in said lapsed list by means of said server device.

7. The data communication method according to claim 5, wherein:
  each of said user terminal devices matches inquiry data that have been acquired by using said biometrics acquisition device with registration data that have been stored in advance in said memory device; and
  when the user of the user terminal device is authenticated as actually said user by means of said matching, said registration data and said inquiry data are transmitted to said server device.

8. The data communication method according to claim 5, further comprising the steps of:
  determining by means of said user terminal devices that registration data that have been stored in advance in said memory devices are data of poor quality that cannot be used in matching;
  when said registration data are not said data of poor quality, matching inquiry data that have been acquired by using said biometrics acquisition devices with registration data that have been stored in advance in said memory devices; and when the user of a user terminal device has been authenticated as actually said user by means of said matching, transmitting said registration data and said inquiry data to said server device;
  when said registration data are said data of poor quality, transmitting said registration data and said inquiry data to said server device.

9. The data communication method according to claim 5, wherein:
  based on said inquiry data and said registration data that have been received, said server device uses a prescribed function to calculate for each of said users similarity information indicating the degree of similarity between said inquiry data and said registration data and transmits to each user terminal device the similarity information of users that are the communication partners;
  based on the registration data that have been stored in advance in said memory device and on the inquiry data that have been acquired by using said biometrics acquisition device, each of said user terminal devices uses the same function as said server device to calculate its own user's similarity information that indicates the degree of similarity between the registration data and inquiry data; and
  based on its own user's similarity information that has been calculated and the similarity information of the user that is the communication partner that has been received from said server device, each of said user terminal devices uses a common function for each said user terminal device to generate a common secret key for decoding data that have been encrypted and transmitted from the user terminal device of said communication partner.

10. A data communication system, said data communication system being of the public-key cryptography type for both authenticating users that transmit and receive data by way of a network and for encrypting said data for transmission and reception, said data communication system comprising:
  user terminal devices: that are used by said users, that are each provided with a biometrics acquisition device for acquiring biometrics data in which biological information of said users has been converted to numerical values, that each use said biometrics acquisition device acquire biometrics data of users, and that each transmit the biometrics data that have been acquired as inquiry data for authenticating said users; and
  a PKI server device that: is provided with a database in which are registered in advance registration data, which are biometrics data of said users; upon receiving said inquiry data from said user terminal devices, based on said registration data and said inquiry data, uses a prescribed function to calculate for each of said users similarity information indicating the degree of similarity of said inquiry data and said registration data; and transmits to each user terminal device the registration data of the user that uses that user terminal device and the similarity information of the user that is the communication partner of the user of that user terminal device; wherein
  each said user terminal device: based on registration data that have been received from said PKI server device and on inquiry data that have been acquired using said biometrics acquisition device, uses the same function as said PKI server device to calculate its own user's similarity information that indicates the degree of similarity between the registration data and the inquiry data; and, based on its own user's similarity information that has been calculated and the similarity information of a user that is the communication partner that has been received from said PKI server device, uses a function that is common to each of said user terminal devices to generate a common secret key for decoding data that have been encrypted and transmitted from the user terminal device of said communication partner.

11. The data communication system according to claim 10, wherein said PKI server device determines whether or not the bit sequences of said registration data and said inquiry data are absolutely identical; when the bit sequences of said registration data and said inquiry data are different, matches said inquiry data with said registration data; and when said matching is successful, authenticates the user of the user terminal device that transmitted said inquiry data as actually said user.

12. The data communication system according to claim 11, wherein said PKI server device is provided with a lapsed list in which biometrics data that cannot be used are registered; wherein, when the bit sequences of said registration data and said inquiry data are determined to be absolutely identical, the registration data of the user that uses the user terminal device that transmitted said inquiry data are registered in said lapsed list.

13. The data communication system according to claim 10, wherein:
  said PKI server device: based on said inquiry data and said registration data that have been received from said user terminal devices, uses a prescribed function to calculate for each said user similarity information indicating the degree of similarity between said inquiry data and said registration data, and transmits to each user terminal device the similarity information of the user that is the communication partner of the user of that user terminal device; and
  each of said user terminal devices: is provided with a memory device for storing, in advance as registration data, biometrics data of users that use the user terminal devices; based on registration data that have been stored in advance in said memory device and on inquiry data that have been acquired by using said biometrics acquisition device, uses the same function as said PKI server device to calculate its own user's similarity information that indicates the degree of similarity between the registration data and the inquiry data; and based on its own user's similarity information that has been calculated and the similarity information of a user that is the communication partner that has been received from said PKI server device, uses a function that is common with each of said user terminal devices to generate a common secret key for decoding data that have been encrypted and transmitted from the user terminal device of said communication partner.

14. A data communication system, said data communication system being of the public-key cryptography type for both authenticating users that transmit and receive data by way of a network and for encrypting said data for transmission and reception, said data communication system comprising:

user terminal devices: that are each used by said users; that are each provided with a biometrics acquisition device for acquiring biometrics data in which biological information of said users have been converted to numerical values, and a memory device for storing the biometrics data of users in advance as registration data; and that each use said biometrics acquisition device to acquire the biometrics data of users and to transmit biometrics data that have been acquired as inquiry data for authenticating said users; and a PKI server device: that is provided with: a database in which the biometrics data of each of said users are registered in advance, and a lapsed list in which biometrics data that cannot be used are registered; that, upon receiving said inquiry data and registration data from said user terminal devices, determines whether data in which bit sequence absolutely identical to inquiry data that have been received from said user terminal device is present in said lapsed list; that, when data in which bit sequence absolutely identical to said inquiry data is not present in said lapsed list, determines whether data in which bit sequence absolutely identical to registration data that have been received from said user terminal device is present in said database; and that, when data in which bit sequence absolutely identical to registration data is present in said database, authenticates the user of the user terminal device that transmitted said registration data and said inquiry data as actually said user.

15. The data communication system according to claim 14, wherein, when data in which bit sequence absolutely identical to inquiry data that have been received from said user terminal device is not present in said lapsed list, said PKI server device stores the inquiry data in said lapsed list.

16. The data communication system according to claim 14, wherein said user terminal devices each match inquiry data that have been acquired using said biometrics acquisition device with registration data that have been stored in advance in said memory device; and when the user of a user terminal device has been authenticated as actually said user by means of said matching, the user terminal device transmits said registration data and said inquiry data to said PKI server device.

17. The data communication system according to claim 14, wherein each of said user terminal devices:

determines whether or not registration data that have been stored in advance in said memory device are data of poor quality that cannot be used in matching; when said registration data are not said data of poor quality, matches inquiry data that have been acquired using said biometrics acquisition device with registration data that have been stored in advance in said memory device; and when the user of the user terminal device is authenticated as actually said user by means of said matching, transmits said registration data and said inquiry data to said PKI server device; and when said registration data are said data of poor quality, transmits said registration data and said inquiry data to said server device.

18. The data communication system according to claim 14, wherein:

said PKI server device, based on said inquiry data and said registration data that have been received from said user terminal devices, uses a prescribed function to calculate for each of said users similarity information that indicates the degree of similarity between said inquiry data and said registration data, and transmits to each user terminal device the similarity information of the user that is the communication partner of the user of that user terminal device; and each of said user terminal devices: based on registration data that have been stored in advance in said memory device and inquiry data that have been acquired using said biometrics acquisition device, uses the same function as said PKI server device to calculate its own user's similarity information that indicates the degree of similarity between the registration data and the inquiry data, and based on its own user's similarity information that has been calculated and similarity information of a user that is the communication partner that has been received from said PKI server device, uses a common function for each said user terminal device to generate a common secret key for decoding data that have been encrypted and transmitted from the user terminal device of said communication partner.

19. A server device for realizing data communication of the public key type for both authenticating users that transmit and receive data by way of a network and for encrypting said data for transmission and reception, said server device comprising:

a data storage device provided with a database in which registration data are registered in advance, these registration data being biometrics data in which biological information of said users has been converted to numerical values; and a processor for: upon receiving inquiry data, which are biometrics data for authenticating a user, from a user terminal device used by a said user, based on said inquiry data and said registration data, uses a prescribed function to calculate for each of said users similarity information that indicates the degree of similarity between said inquiry data and said registration data; and transmits to each user terminal device the registration data of the user that uses that user terminal device and similarity information of the user that is the communication partner of the user of that user terminal device.

20. The server device according to claim 19, wherein said processor determines whether or not the bit sequences of said registration data and said inquiry data are absolutely identical; when the bit sequences of said registration data and said inquiry data are different, matches said inquiry data with said registration data; and when said matching is successful, authenticates the user of the user terminal device that transmitted said inquiry data as actually said user.

21. The server device according to claim 20, wherein:
    said data storage device is further provided with a lapsed list for registering biometrics data that cannot be used; and
    when said processor determines that the bit sequences of said registration data and said inquiry data are absolutely identical, said processor stores the registration data of the user that uses the user terminal device that transmitted said inquiry data in said lapsed list.

22. The server device according to claim 19, wherein said processor:
    based on said inquiry data and said registration data that have been received from said user terminal devices, uses a prescribed function to calculate for each of said users similarity information that indicates the degree of similarity between said inquiry data and said registration data; and
    transmits to each user terminal device the similarity information of the user that is the communication partner of the user of that user terminal device.

23. A server device for realizing data communication of the public-key cryptography type for both authenticating users that transmit and receive data by way of a network and for encrypting said data for transmission and reception, said server device comprising:
    a data storage device provided with a database in which are registered in advance registration data, which are biometrics data in which biological information of said users has been converted to numerical values, and a lapsed list in which are registered biometrics data that cannot be used; and
    a processor for: upon receiving, from a user terminal device used by a said user, inquiry data that are biometrics data for authenticating the user and registration data that are biometrics data that have been registered in advance in said user terminal device, determining whether or not data in which bit sequence absolutely identical to the inquiry data that have been received from said user terminal device is present in said lapsed list; when data in which bit sequence absolutely identical to the inquiry data is not present in said lapsed list, determining whether or not data in which bit sequence absolutely identical to registration data that have been received from said user terminal device is present in said database; and when data in which bit sequence absolutely identical to the registration data is present in said database, authenticating the user of the user terminal device that transmitted said registration data and said inquiry data as actually said user.

24. The server device according to claim 23, wherein when data in which bit sequence absolutely identical to the inquiry data that have been received from said user terminal device is not present in said lapsed list, said processor stores the inquiry data in said lapsed list.

25. The server device according to claim 23, wherein said processor:
    based on said inquiry data and said registration data that have been received from said user terminal device, uses a prescribed function to calculate for each user similarity information indicating the degree of similarity between said inquiry data and said registration data; and
    transmits to each user terminal device the similarity information of the user that is the communication partner of the user of that user terminal device.

26. A non-transitory computer readable recording medium with a computer program recorded thereon for realizing, by means of a computer, data communication of the public-key cryptography type for both authenticating users that transmit and receive data by way of a network and encrypting said data for transmission and reception, wherein said computer program causes said computer to execute processes of:
    when said computer receives, from user terminal devices used by said users, inquiry data, which are biometrics data for authenticating the users in which biological information of the users has been converted to numerical values,
    based on registration data which are biometrics data of said users that have been registered in advance in a database and said inquiry data, using a prescribed function to calculate for each of said users similarity information indicating the degree of similarity between said inquiry data and said registration data; and
    transmitting to each user terminal device the registration data of the user that uses that user terminal device and the similarity information of a user that is the communication partner of the user of that user terminal device.

27. The non-transitory computer readable recording medium according to claim 26, wherein said computer program causes said computer to further execute processes of:
    determining whether the bit sequences of said inquiry data is absolutely identical to that of said registration data;
    when the bit sequences of said registration data and said inquiry data are different, matching said inquiry data with said registration data; and
    when said matching is successful, authenticating the user of the user terminal device that transmitted said inquiry data as actually said user.

28. The non-transitory computer readable recording medium according to claim 27, wherein said computer program causes said computer to further execute processes of:
    when the bit sequences of said registration data and said inquiry data are determined to be absolutely identical, storing the registration data of the user that uses the user terminal device that transmitted said inquiry data in a lapsed list in which are registered biometrics data that cannot be used.

29. The non-transitory computer readable recording medium according to claim 26, wherein said computer program causes said computer to further execute processes of:
    based on said inquiry data and said registration data that have been received from said user terminal device, using a prescribed function to calculate for each of said users similarity information indicating the degree of similarity between said inquiry data and said registration data; and
    transmitting to each user terminal device the similarity information of the user that is the communication partner of the user of that user terminal device.

30. A non-transitory computer readable recording medium with a computer program recorded thereon for realizing, by means of a computer, data communication of the public-key cryptography type for both authenticating users that transmit and receive data by way of a network and for encrypting said data for transmission and reception, said computer program causing said computer to execute processes of:
    when said computer receives, from a user terminal device that is used by a said user, inquiry data that are biometrics data of the users and registration data that are biometrics data that have been registered in advance in said user terminal devices, determining whether or not data of absolutely identical bit sequence as the registration data that have been received from said user terminal device are present in a lapsed list which contains stored biometrics data that cannot be used;

when data in which bit sequence absolutely identical to the inquiry data is not present in said lapsed list, determining whether or not data of a bit sequence absolutely identical to the registration data that have been received from said user terminal device is present in said database; and when data in which bit sequence absolutely identical to the registration data is present in said database, authenticating the user of the user terminal device that transmitted said registration data and said inquiry data as actually said user.

31. The non-transitory computer readable recording medium according to claim 30, wherein said computer program causes said computer to further execute a process of:

when data in which bit sequence absolutely identical to the inquiry data that have been received from said user terminal device is present in said lapsed list, storing said inquiry data in said lapsed list by means of said server device.

32. The non-transitory computer readable recording medium according to claim 30, wherein said computer program causes said computer to further execute processes of:

based on said inquiry data and said registration data that have been received from said user terminal devices, using a prescribed function to calculate for each of said users similarity information indicating the degree of similarity between said inquiry data and said registration data; and transmitting to each user terminal device similarity information of the user that is the communication partner of the user of that user terminal device.

33. A terminal device used by a user for transmitting and receiving data that have been encrypted by means of public-key cryptography by way of a network, said terminal device comprising:

a biometrics acquisition device for acquiring biometrics data in which biological information of said user has been converted to numerical values; and a processor for using said biometrics acquisition device to acquire biometrics data of the user and transmitting the biometrics data, that have been acquired as inquiry data for authenticating said user, to a server device, wherein said processor:

based on registration data that are biometrics data of its own user that have been registered in advance in said server device and that have been received from said server device and inquiry data that have been acquired using said biometrics acquisition device, uses a prescribed function to calculate its own user's similarity information that indicates the degree of similarity between said registration data and said inquiry data; and based on its own user's similarity information that has been calculated and similarity information of a user that is the communication partner that has been received from said server device, uses a function common to each of said terminal devices to generate a common secret key for decoding data that have been encrypted and transmitted from the terminal device that is used by said communication partner.

34. The terminal device according to claim 33, further comprising a memory device for storing in advance as registration data biometrics data of its own user that uses said terminal device, wherein said terminal device:

based on registration data that have been stored in advance in said memory device and inquiry data that have been acquired using said biometrics acquisition device, uses a prescribed function to calculate its own user's similarity information that indicates the degree of similarity between said registration data and said inquiry data; and based on its own user's similarity information that has been calculated and similarity information of a user that is the communication partner that has been received from said server device, uses a function that is common to each of said terminal devices to generate a common secret key for decoding data that have been encrypted and transmitted from the terminal device that is used by said communication partner.

35. The terminal device according to claim 34, wherein said processor:

determines whether or not the registration data that have been stored in advance in said memory device are data of poor quality that cannot be used in matching;

when said registration data are not said data of poor quality, matches inquiry data that have been acquired using said biometrics acquisition device with registration data that have been stored in advance in said memory device; and when the user of the terminal device has been authenticated as actually said user by means of said matching, transmits said registration data and said inquiry data to said server device.

36. The terminal device according to claim 35, wherein when said registration data are said data of poor quality, said processor transmits said registration data and said inquiry data to said server device.

* * * * *